United States Patent [19]

Langer

[11] Patent Number: 4,600,634
[45] Date of Patent: Jul. 15, 1986

[54] FLEXIBLE FIBROUS ENDOTHERMIC SHEET MATERIAL FOR FIRE PROTECTION

[75] Inventor: Roger L. Langer, Hudson, Wis.

[73] Assignee: Minnesota Mining and Manufacturing Company, St. Paul, Minn.

[21] Appl. No.: 697,947

[22] Filed: Feb. 4, 1985

Related U.S. Application Data

[63] Continuation-in-part of Ser. No. 515,768, Jul. 21, 1983, abandoned.

[51] Int. Cl.$^4$ .......................... B32B 5/02; B32B 5/16
[52] U.S. Cl. ...................................... 428/220; 52/232; 162/159; 174/68 C; 428/281; 428/283; 428/288; 428/323; 428/329; 428/920; 428/921
[58] Field of Search ............... 428/283, 281, 329, 920, 428/921, 323, 288, 332, 226; 52/232; 174/686; 162/152, 156, 159

[56] References Cited

U.S. PATENT DOCUMENTS

| | | | |
|---|---|---|---|
| 3,458,329 | 7/1969 | Owens et al. | 106/39 |
| 3,745,060 | 7/1973 | Jumentier et al. | 161/170 |
| 3,772,455 | 11/1973 | Nicodemus et al. | 174/121 |
| 3,827,933 | 8/1974 | Duggins et al. | 161/176 |
| 3,849,178 | 11/1974 | Feldman | 117/72 |
| 3,916,057 | 10/1975 | Hatch et al. | 428/236 |
| 3,928,210 | 12/1975 | Peterson | 252/3.1 |
| 3,929,167 | 12/1975 | Bickel | 174/68 C |
| 4,064,359 | 12/1977 | Peterson et al. | 174/107 |
| 4,130,458 | 12/1978 | Moore et al. | 162/159 |
| 4,174,331 | 11/1979 | Myles | 260/29.1 |
| 4,224,374 | 9/1980 | Priest | 428/310 |
| 4,225,383 | 9/1980 | McReynolds | 162/156 |
| 4,255,318 | 3/1981 | Kaide et al. | 260/42.18 |
| 4,273,821 | 6/1981 | Pedlow | 428/215 |
| 4,273,879 | 6/1981 | Langer et al. | 521/91 |
| 4,278,468 | 7/1981 | Selbe et al. | 106/111 |
| 4,286,013 | 8/1981 | Daroga et al. | 428/266 |
| 4,305,992 | 12/1981 | Langer et al. | 428/324 |
| 4,315,075 | 2/1982 | Gardner | 521/71 |
| 4,363,199 | 12/1982 | Kucheria et al. | 52/221 |
| 4,371,579 | 2/1983 | McCaskey et al. | 428/204 |
| 4,374,202 | 2/1983 | Zucker et al. | 501/82 |
| 4,433,020 | 2/1984 | Narukawa et al. | 428/920 |

FOREIGN PATENT DOCUMENTS

| | | |
|---|---|---|
| 2539388 | 12/1976 | Fed. Rep. of Germany . |
| 2844693 | 4/1979 | Fed. Rep. of Germany . |
| 2257555 | 9/1974 | France . |

OTHER PUBLICATIONS

Keating, J. Z., "Alumina-Trihydrate: Flame-Retarding, Smoke-Supressing Filler", *Plastics Compounding*, Jul./Aug., 1980, pp. 23–35.
Kaowood advertising brochure from Babcock and Wilcox Company.
Fiberfrax data sheet from Carborundum Company.

*Primary Examiner*—Paul J. Thibodeau
*Attorney, Agent, or Firm*—D. M. Sell; J. A. Smith; D. B. Little

[57] ABSTRACT

This invention relates to a non-intumescent, non-char forming, endothermic, essentially inorganic, flexible, fire-protective sheet material. The flexible sheet is made of a composition comprising:

(a) an inorganic fiber, such as fiberglass and aluminosilicate refractory fibers;
(b) an organic polymer binder, such as an acrylic resin; and
(c) an inorganic endothermic filler, such as alumina trihydrate.

The weight ratio of organic to inorganic constituents is less than about 0.10, and the weight ratio of inorganic endothermic filler of part (c) to inorganic fiber of part (a) is in the range of about 0.5 to 50. This sheet is a useful fire barrier wrap for conduits and cable trays in building construction, which provides excellent fire protection, and the current capacity derating of cables is significantly less with this new fibrous sheet than it is in the case of known fire barrier sheet materials.

22 Claims, No Drawings

FLEXIBLE FIBROUS ENDOTHERMIC SHEET MATERIAL FOR FIRE PROTECTION

CROSS REFERENCE TO RELATED APPLICATION

This application is a continuation-in-part of application Ser. No. 515,768 filed July 21, 1983, now abandoned.

TECHNICAL FIELD

This invention is in the field of fire protection materials. Specifically, it relates to fire barrier materials useful in protecting articles such as electrical systems during a fire.

BACKGROUND

Fire protection in areas with high concentrations of instrument, communication and power transmission wires and cables is very important, especially in such installations as large buildings and power plants. Such wires and cables are constructed with electrically insulating coverings which are combustible and can provide a pathway by which fire might spread. Fire protection for such wires and cables is critical when power supply is necessary for the maintenance of controls, for example, in aircraft or factories.

Intumescent sheets for fire protection are disclosed in U.S. Pat. No. 4,273,879. These particular sheets have a significant content of organic materials (binder and char forming resin). During combustion, these organic materials can cause exothermic reactions increasing the temperature of the fire.

There are other fire protection materials which may be produced in a sheet form and which are designed to retard the spread of fire and heat by an endothermic reaction. See, for example, U.S. Pat. No. 4,315,075 describing a neoprene foam containing hydrated alumina.

Alumina trihydrate ($Al_2O_3 \cdot 3H_2O$) has 34.6% chemically combined water of hydration. This water is liberated beginning at about 230° C. with complete dehydration at about 600° C. This endothermic dehydration is known to have a cooling effect in compositions of which alumina trihydrate is a component. The water vapor given off also dilutes the combustible gases which may be present during a fire to help arrest combustion. Alumina trihydrate (ATH) is a known fire retardant filler in the plastics industry.

Inorganic materials in the form of fiber blankets have been used for the protection of conduits and cable trays. One such fiber blanket is prepared from alumino-silicate glass fibers and marketed under the trademark Kaowool by The Babcock & Wilcox Company. In order to have one hour fire protection, the alumino-silicate fiber blankets are wrapped around cable trays in a thickness of usually two inches or more. This blanket insulation has low thermal conductivity and, therefore, not only insulates from the effects of fire but also retains in the conduit the heat generated by the current carried through electrical cables under normal conditions. With the dissipation of normal heat generated by the line resistance thus retarded, the cables in trays or conduit must be derated. That is, the amount of current which they are rated to carry (ampacity or amp capacity) must be decreased.

It is desired to provide a composition which gives good fire protection to cable trays and conduits with a minimum reduction in the ampacity rating of the electrical cables in them.

DISCLOSURE OF INVENTION

The invention is summarized as an endothermic, non-insulating, flexible, fibrous material made of a composition comprising:
(a) inorganic fiber;
(b) organic polymer binder; and
(c) an inorganic, endothermic filler which undergoes an endothermic reaction between about 100° and 600° C.;

having a weight ratio of organic to inorganic constituents of less than about 0.10 (preferably below 0.08); and a weight ratio of inorganic endothermic filler of part (c) to inorganic fiber of part (a) in the range of about 0.5 to 40.

This invention provides a composition which minimizes the fuel source organic content while still maintaining the necessary strength and physical integrity required of fire protection application methods. The low ratio of organic binder to inorganic material of this invention maximizes utilization of the endothermic reaction and cooling vapor retention aspects of the inorganics (i.e. retention of the water vapor given off in the interstices of the inorganic fiber). This low ratio minimizes fuel contribution to any fire, and therefore minimizes smoke and harmful gases from combustion. Preferably, organic materials comprise less than six percent (6%) by weight of the inventive material.

This new endothermic material is conveniently made in the form of a mat or sheet. It has been found that although the organic binder content is very low, relatively high sheet densities are maintained, e.g. 0.70–1.5 g/cc as compared to 0.1–0.3 g/cc for fiber blanket type systems. The more dense sheet is advantageous because it provides an increased thermal conductivity and therefore, better heat dissipation for cables in normal service. Furthermore, the sheet of this invention provides a more compact wrap to protect such items as cables, cable trays and conduits, of particular importance in areas of limited space such as airframe structures. The usefulness of the inventive sheet is not limited to the previously mentioned items, and it can be used to protect any article from fire by enclosing the article within the sheet.

It is believed that the stability of the inorganic materials in this composition will provide superior aging qualities over the fire barrier materials of the prior art which contain larger quantities of organic materials.

These new compositions do not rely on inorganic binders (such as clays, colloidal silica or cementitious materials) or on the insulative effect of a fibrous matrix. They rely on the porosity and mechanical entanglement of the fibers, and the materials remain flexible while the useful proportionality of endothermic powders to fiber can be quite high.

The inorganic fiber is chosen from materials which can withstand very high temperatures without significant detrimental changes in physical properties, such as refractory alumino-silicate fibers.

The sheets of this invention are preferably formed by standard paper-making techniques, either hand laid or machine laid on a Fourdrinier or cylinder type paper machine.

DETAILED DESCRIPTION

The inorganic fibers used in the protective material of this invention are refractory materials which combine high strength, good thermal resistance and the ability to retain relatively high levels of high density endothermic filler. Examples of useful inorganic fibers include graphite, silica, alumina-silica, calcium oxide-silica, asbestos, and glass fibers. Alumino-silicate fibers are preferred and are available commercially under the trademarks Fiberfrax SK-2600 from the Carborundum Company, Cerafiber from Manville Corporation and Kaowool from Babcock and Wilcox. The fiber diameter is usually less than about 6 micrometers, preferably less than one micrometer. Grades of fiberglass having relatively small fiber diameters (0.4–0.9 micrometers) offer a lower fiber bulk density and allow ATH filler level to be increased significantly. Larger fiber diameters result in a material with a lower number of fibers for a given mass, yielding sheets of lower tensile strength, and are usually more difficult to handle on paper making machinery. The physical properties of a typical aluminosilicate (Fiberfrax) are: continuous use limit 1260° C.; melting point 1790° C.; normal packing density 96–192 kg/m$^3$; fiber lengths up to 102 mm; specific gravity 2.73 and fiber strength of $2.76 \times 10^9$ N/m$^2$. Blends of fiberglass and ceramic fibers (e.g. 5% ceramic and 3% fiberglass in the total composition) have been particularly useful, since they help prevent the shrinkage which may occur if fiberglass is the only fiber used in the sheet.

The amount of organic binder is preferably 1–6 weight percent of the total, more preferably about 2%. Suitable binders can include various polymers and elastomers in latex form, for example, natural rubber latex, styrene-butadiene latices, butadiene acrylonitrile latices, and latices of acrylate and methacrylate polymers and copolymers (e.g., polymethyl acrylate, polyethyl acrylate, and polymethyl methacrylate). It is preferred to use halogen-free polymers to avoid decomposition and release of noxious and corrosive halogen gases during a fire. Acrylic polymers are preferred because of their excellent heat resistance, aging properties, and noncorrosive combustion products.

The inorganic, endothermic filler raw material is preferably a powder, having a mean particle size less than about 60 micrometers, more preferably about 12 micrometers. Larger filler particles (e.g. greater than 60 micrometers) tend to separate the inorganic fibers during processing, resulting in a sheet of lower tensile strength. As particle size decreases the dewatering of the slurry in the manufacturing process can become more difficult, especially in the manufacture of thicker mat products.

Preferably, the weight ratio of endothermic filler to inorganic fibers is in the range of about 5.0 to 40.

Typical fillers would be hydrated metal oxides and borates. The filler should be relatively insoluble in water, chemically inert, and should not require a synergist. Alumina trihydrate, magnesium hydroxide (hydrated magnesia), and zinc borate possess these properties. Alumina trihydrate is preferred.

The flexible, fibrous, endothermic materials of this invention may be made by mixing the ingredients together with water to form a slurry. The latex is coagulated, and the resulting floc suspension flows to a head box and from there onto the Fourdrinier wire screen. The dewatered floc drains readily and knits together to yield a homogeneous mass in which the inorganic fibers are mechanically interlocked and bound together by the polymer binder, and the endothermic filler occupies the interstices between the fibers. Larger flocs are preferred for thicker sheets, to give good drainage necessary in the manufacturing process. The green sheet from the Fourdrinier machine is densified by calendering and dried by passing through heated drying rolls.

One alternative embodiment of the invention involves adding a backing to the sheet material already described. A suitable backing material is aluminum foil having a thickness of about 0.08 mm and a pressure-sensitive adhesive coated on one side. The backing is adhered to the protective sheet by means of the adhesive. Such backing can give an added degree of strength to sheet material which must be bent around sharp corners or small radii.

Another alternative is to add a fabric scrim which (like the foil) can give added strength, abrasion resistance, dimensional stability and resistance to cracking to the endothermic mat. A scrim can be a non-woven fabric or a woven (e.g. plain weave) fabric. For example, a non-woven nylon polyamide scrim may be added to the mat by: a. laminating the fabric to a silicone coated release liner on one side and applying adhesive on the other; b. contacting the adhesive-coated side to the endothermic mat; c. removing the release liner; and d. calendering the fabric/mat combination.

The fibrous sheets of this invention are typically more than 2 millimeters (preferably at least about four millimeters) thick and may be secured or held in position around the articles to be protected (conduits and cable trays) by being wrapped with a securing means resistant to high temperatures such as ceramic fiber cord or wire cloth. It is desirable to have the wrapping restrain the sheet, holding it tightly around the cables being protected particularly when exposed to open fire. A suitable ceramic fiber cord can be made from the fibers described in U.S. Pat. Nos. 3,709,705, 3,795,524 and 4,047,965. One commercially available suitable cord is sold under the trademark Nextel brand ceramic fiber cord by Minnesota Mining and Manufacturing Company.

This invention will be further clarified by a consideration of the following examples, which are intended to be purely exemplary. In these examples, two ASTM tests have been used to evaluate the inventive materials. ASTM test D3286-73 measures the gross calorific value of a fuel in an isothermal-jacket bomb calorimeter. The purpose of this test is to determine how much the fire barrier material might actually contribute as fuel to a fire. ASTM test E119-78 is a standard fire test for building and construction materials.

EXAMPLE I

In order to produce large quantities of the fire protective material of this invention, a 26 inch (66 cm) wide Fourdrinier paper machine was used. 122 pounds (55.3 kg) of alimino-silicate fibers were added to 1000 gallons (3785 l) of water in a Mordon slush maker which agitated the mixture for three minutes to produce a slurry. This slurry was pumped to a 2000 gallon (7570 l) stock chest and diluted with an additional 265 gallons (1000 l) of water. 53 pounds (24 kg) of acrylic latex obtained as Rhoplex HA-8 non-ionic latex containing about 46% solids by weight from Rohm & Haas Company and varying amounts and sizes of alumina trihydrate obtained from Great Lakes Minerals Company were added to the fiber slurry as shown in Table 1 below.

TABLE 1

Alumina Trihydrate Used (in Kg) Subdivided by Particle Size

| | Sample | | | | | | | | | |
|---|---|---|---|---|---|---|---|---|---|---|
| | 1 | 2 | 3 | 4 | 5 | 6 | 7 | 8 | 9 | 10 |
| Mean Particle Size of Fraction: | | | | | | | | | | |
| 4 micrometers | 28.6 | 44.5 | 66.7 | 99.8 | 155.1 | 44.5 | 66.7 | 99.8 | | |
| 8 micrometers | | | | | | | | | 155.1 | 155.1 |
| 45 micrometers | | | | | | 55.3 | 88.4 | 99.8 | | |
| Total Used (Kg) | 28.6 | 44.5 | 66.7 | 99.8 | 155.1 | 99.8 | 155.1 | 199.6 | 155.1 | 155.1 |

A dilute (about 25 weight percent) aqueous alum solution was then added to the latex-fiber-ATH slurry while it was being mixed, in sufficient amount to reduce the pH to between about 4.7 and 5.1 (preferably about 4.9) which coagulates the latex. The latex-fiber-ATH slurry was then pumped at controlled rates to a mixing tank where a flocculant or polyelectrolyte was added in dilute solution at about 50 ml per minute for particle retention and to aid in drainage. Suitable polyelectrolytes would be Bufloc 170 from Beckamn Laboratory Inc., used in 0.2 percent solution (50 ml of polyelectolyte solution per 50 gallons or 189 liters of slurry) or Lufax 295 cationic polyelectrolyte from Rohm & Haas Company.

The slurry flowed from the mixing tank to a headbox and on to the Fourdrinier wire to form a composite sheet up to 66 cm wide. The sheet, after being dewatered to about 50 weight percent water on the Fourdrinier machine, was calendered at about 0.06 N force to further dewater (less than about 30 percent water) and densify the sheet. The wet sheet was dried by passing it through heated drying rolls to reduce the moisture content to less than about three percent. It was then wound on to rolls. Sheet product of varied thicknesses can be produced by varying the force or pressure on the sheet calender. The material weight of the sheet can be adjusted by changing machine speed (e.g. speed of Fourdrinier machine) or the flow rate of the slurry. The final compositions of samples 1-10 are shown in Table 2.

TABLE 2

Endothermic Sheet Composition (weight percent)

| | Sample | | | | | | | | | |
|---|---|---|---|---|---|---|---|---|---|---|
| | 1 | 2 | 3 | 4 | 5 | 6 | 7 | 8 | 9 | 10 |
| Acrylic Resin | 11.6 | 10.0 | 8.3 | 6.7 | 5.0 | 6.7 | 5.0 | 4.2 | 5.0 | 2.5 |
| Alumino-Silicate Fibers | 58.4 | 50.0 | 41.7 | 33.3 | 25.0 | 33.3 | 25.0 | 20.8 | 25.0* | 25.6* |
| Alumina-Trihydrate | 30 | 40.0 | 50.0 | 60.0 | 70.0 | 60.0 | 70.0 | 75.0 | 70.0 | 71.9 |
| Sheet Density (g/cc) | 0.47 | 0.52 | 0.61 | 0.72 | 0.87 | 0.58 | 0.69 | 0.79 | 0.82 | 0.78 |

*obtained as Fiberfrax SK2600, 2.5 micrometer mean fiber diameter. All other samples in Table 2 used Cerafibers VFS alumino-silicate having about a 3.5 micrometer mean fiber diameter.

Several examples of known fire protection materials were used for purposes of testing as controls against the experimental samples of this invention. Some of these were available in commercial form. Others were formulated from reference patents. Those which were not in sheet form were in the form of mastics or putties which were trowelled or pressed into sheet form for comparative testing. The control samples are shown in Table 3.

TABLE 3

Control Samples

| Sample No. | C1 | C2 | C3 | C4 | C5 | C6 | C7 |
|---|---|---|---|---|---|---|---|
| Type of material: | Intumescent insulating sheet | Intumescent char-forming sheet | Intumescent mastic | Endothermic sheet | Endothermic mastic | Endothermic mastic | Insulating Blanket |
| Reference: | 3,916,057 | 4,273,879 | Thomas-* Betts Co. FST-601 | 4,315,075 | 4,255,318 Example 1 | 4,255,318 Example 5 | Babcock & Wilcox Kaowool |
| Composition (weight/percent): | | | | | | | |
| Acrylic resin | 7.0 | — | | — | — | — | — |
| Alumina-silica fibers | 34.0 | — | | — | — | — | 100 |
| Unexpanded vermiculite | 59.0 | — | | — | — | — | — |
| Polychlorprene | — | 23.4 | | 13.9 | 23.3 | 21.2 | — |
| Alumina trihydrate | — | — | | 79.5 | 69.7 | 63.8 | — |
| Glass fibers | — | — | | — | 7.0 | 6.4 | — |
| Asbestos fibers | — | — | | — | — | 2.2 | — |
| Bentonite clay | — | — | | — | — | 6.4 | — |
| Sodium silicate | — | 52.5 | | — | — | — | — |
| Dioctyl phthlate | — | 8.2 | | 5.8 | — | — | — |
| Phenolic resin | — | 5.5 | | — | — | — | — |
| Inorganic fillers | — | 8.7 | | — | — | — | — |
| Vulcanizing agents | — | 1.7 | | 0.8 | — | — | — |
| Density (g/cc)** | 0.62 | 1.5 | 0.74 | 1.45 | 1.0 | 1.0 | 0.13 |

*Commercial product - composition unknown
**All materials dried to less than 3 weight percent moisture.

Inventive samples 1-10 and control samples C1-C6 were evaluated using ASTM test D3286. The gross calorific values of several of the materials are given below in Table 4.

TABLE 4

| Gross Calorific Value Determined by ASTM D3286 | | | |
|---|---|---|---|
| Inventive Sample | Heat Value (Joules/g) | Control Sample | Heat Value (Joules/g) |
| 1 | 2790 | C1 | 2,080 |
| 2 | 2560 | C2 | 11,160 |
| 3 | 2410 | C3 | 5,580 |
| 4 | 1280 | C4 | 6,050 |
| 9 | 1190 | C5 | 6,050 |
| 10 | 580 | C6 | 5,580 |

The comparative test data in Table 4 show the calorific value of the control materials to be substantially greater than the composition of this invention in all but one case. These higher values result from the greater organic content. It is preferred to select compositions of the present invention having a calorific value of no more than about 2400 Joules/g, more preferably less than about 2000 Joules /g.

EXAMPLE II

In order to maintain the integrity and flexible nature of the inventive sheet system during the covering or wrapping operation, several thinner layers are applied separately to achieve the necessary total thickness. Preferably a metal foil (0.08 mm thick) is laminated to one side of each such layer to provide a flexible yet tough sheet that can be conveniently taped with metal foil tape at abutting sheet edges of the wrap covering. A final wrap of high temperature ceramic fiber cords (alumina borosilicate fiber such as Nextel 4/5 cord) or stainless steel wires may be placed around the fire protective sheet, spaced at about 20 cm intervals or in a spiral fashion to ensure the maintainance of complete coverage and prevent the unwinding of the protective sheet, particularly under fire conditions.

Fire tests in accordance with ASTM E119-78 were conducted on specimens of 2.5 cm diameter conduits and 10.2 by 30.5 cm cable trays wrapped by the above-described procedure. The quantity of sheet material used is measured by: (a) the number of layers, (b) the total thickness, and (c) by weight. The preferred method measures the weight of protective sheet material per linear distance in kilograms per meter covering the conduit or cable tray. The test specimens were heated inside furnaces fueled with natural or propane gas, and the heating rate of the furnace interiors were in conformance with ASTM E119-78. The furnace hot zone lengths for the conduit and cable tray tests were 61 cm and 245 cm respectively. The time required for the surface temperature of the conduit and cable tray under the fire protective sheet wrap to reach 315° C. was used to compare the samples. 315° C. is the temperature at which electrical cables are often observed to begin to deteriorate and short circuit. This comparison is shown in Table 5 below.

TABLE 5

| ASTM E119-78 Flame Test of 2.54 cm Conduit | | | | |
|---|---|---|---|---|
| | Inventive Sample No. | | | |
| | 6 | 8 | 9 | 9 |
| Time to 315° C. (min) | 46 | 72 | 57 | 67 |
| Material wt. (Kg/m) | 2.2 | 3.9 | 3.0 | 3.7 |
| | Control Example No. | | | |
| | C1 | C1 | C2 | C4 |
| Time to 315° C. (min) | 35 | 44 | 9 | 57 |
| Material wt. (Kg/m) | 2.4 | 3.9 | 3.0 | 4.0 |

TABLE 5-continued

| ASTM E119-78 Flame Test of 10.2 × 30.5 cm Cable Tray | | | |
|---|---|---|---|
| | Inventive Example No. | Control Example No. | |
| | 9 | C1 | C2 | C7 |
| Time to 315° C. (min) | 61 | 54 | 40 | 39 |
| Material wt. (Kg/m) | 12.7 | 12.1 | 21.0 | 8.2 |

These fire tests show that the composition of the inventive sheets extends the fire exposure times substantially over known materials. It should be noted that the putties or mastics of comparative control samples numbers C3, C5 and C6 could not be applied in a uniform thickness. Adhesion to the conduit and cable tray surfaces was also a problem; therefore, these materials could not be tested in this manner. Only the sheet materials were fire tested.

In the case of the intumescent sheet materials of control samples C1 and C2, special precautions for designing the wrapping configuration were required. Radial cracks occur in the intumesced fire protective materials around the perimeter of the conduit or at the corners of the cable tray which allows direct heat exposure to the metal surface. A loose, eve-shaped or corrugated wrap with a wire mesh overlay for containment was employed to limit the material intumescence and control such cracking in order to obtain a meaningful test. More details on wrapping intumescent fire protective sheeting around conduits can be found in commonly assigned patent U.S. Pat. No. 4,513,173. The sheets of the present invention remained tightly and neatly wrapped on the conduit or cable tray. Compared to the intumescent materials which undergo a significant volume increase during heat exposure, there was essentially no physical change in the inventive sheet dimensions during heat exposure.

EXAMPLE III

The following flame test was performed on the inventive material and on the controls in the form of putty or mastic. The test specimens were cut or formed to 23 by 28 cm rectangles and glued or formed to one side of a metal sheet 0.3 mm thick. The test specimen weight and thickness was recorded. A thermocouple was attached to the surface in the center of the metal sheet to measure the cold side surface temperature. The test sheet was placed vertically and centered in front of a flame source generated by a propane fueled exhaust gas simulator (from Maremont Company) which provided a hot side surface temperature of 1,050° to 1,100° C. The rate of temperature rise on the cold side surface was then recorded. The results obtained are shown in Table 6 below.

TABLE 6

| | Inventive Sample 9 | Control Sample No. | |
|---|---|---|---|
| | | C3 | C5 |
| Specimen Weight (Kg): | 0.54 | 0.59 | 0.77 |
| Specimen Thickness mm | 11.0 | 10.2 | 11.4 |
| Time (minutes): | Cold Side Temperature (°C.) | | |
| Start | 23 | 23 | 23 |
| 5 | 87 | 99 | 114 |
| 10 | 133 | 123 | 167 |
| 15 | 163 | 213 | 198 |
| 20 | 177 | 262 | 207 |

TABLE 6-continued

| | | | |
|---|---|---|---|
| 25 | 182 | 279 | 208 |
| 30 | 182 | 290 | 226 |
| 35 | 183 | 298 | 228 |
| 40 | 183 | 309 | 238 |
| 45 | 183 | — | 245 |
| 50 | 182 | — | 256 |
| 55 | 183 | — | — |
| 60 | 186 | — | — |

The inventive sheet sample maintained a much lower temperature for a significantly longer time than either of the control sample mastics.

EXAMPLE IV

An ampacity study of fire barrier protected electrical conduits was conducted. The fire barrier materials used in the study included: the inventive material; commercially available intumescent mats comprising acrylic resin, alumina-silica fibers and unexpanded vermiculite (control sample C1); and Kaowool blankets avaiable from Babcock and Wilcox Company. The lengths of intumescent mat were 457 mm for the first layer, 572 mm for the second, and 635 mm for the third. The lengths of the inventive mat were 394 mm for the first layer, 445 mm for the second, and 500 mm for the third. The lengths of Kaowool blankets used were 610 mm for the first layer, and 749 mm for the second. The Kaowool blankets were applied by completely wrapping around the conduit and overlapping at least 76 mm. In these tests, Scotch ® brand 33 tape from Minnesota Mining and Manufacturing Co., a black electrical vinyl tape, was wrapped in a helical fashion around the outside of the test specimen to provide a black surface solely to raise the surface emissivity in some tests. In each case, the length of wrapped conduit under test was about 2.45 meters.

All the ampacity derating factors were calculated with respect to the case of bare conduit with unaltered surface The equation used was $$\text{percent derating} = (1 - (\Delta T1/\Delta T2)^{\frac{1}{2}}) \times 100$$

where $\Delta T1$ is the conductor temperature rise above ambient in the bare conduit case and $\Delta T2$ is the conductor temperature rise above ambient for the protected conduit.

The conduit tested was a 4 inch (10.2 cm) internal diameter electrical grade schedule 40 steel containing four 500 MCM 600 volt XLPE insulated copper conductor cables. The thicknesses of each fire barrier layer were: for the inventive sheets about 5 mm; for the intumescent mat about 5 mm; and for the Kaowool blanket about 25 mm. The conductor temperatures measured for bare steel at 190, 300 and 400 amps were 39.7° C., 61.2° C., and 85.1° C. respectively and for steel conduit covered with black tape 37.1° C., 54.2° C., and 76.2° C. at the same respective currents. Ambient temperature ranged between about 22° and 26° C. for these tests. The results are shown in Table 7 below:

TABLE 7

| | | | Average Conductor Temperature (°C.) | | | Percent Ampacity Derating | | |
|---|---|---|---|---|---|---|---|---|
| Current (amperes) | Number of Fire Barrier Layers | Outermost Surface | C1 Intumescent Mat | C7 Kaowool | Sample 5 Inventive Sheet | C1 Intumescent Mat | C7 Kaowool* | Inventive Sheet (Sample 5) |
| 190 | 1 | aluminum | 46.5 | 48.8 | 42.6 | 19.2 | 23.3 | 8.7 |
| 300 | 1 | aluminum | 78.1 | 90.0 | 65.5 | 18.0 | 25.6 | 6.2 |
| 400 | 1 | aluminum | 118.1 | 146.8 | 94.0 | 19.8 | 29.6 | 6.8 |
| 190 | 1 | tape | 43.2 | | 39.3 | 10.7 | | 0.3 |
| 300 | 1 | tape | 71.4 | | 58.0 | 12.1 | | −4.9 |
| 400 | 1 | tape | 108.4 | | 81.9 | 15.3 | | −2.8 |
| 190 | 2 | aluminum | 48.0 | 58.0 | 42.9 | 24.1 | 34.9 | 10.6 |
| 300 | 2 | aluminum | 87.0 | 115.7 | 70.0 | 24.8 | 37.1 | 10.5 |
| 400 | 2 | aluminum | 136.5 | 209.9** | 103.0 | 27.2 | 43.0** | 11.9 |
| 190 | 2 | tape | 47.1 | | 40.6 | 21.0 | | 4.8 |
| 300 | 2 | tape | 80.8 | | 59.6 | 20.7 | | 0.4 |
| 400 | 2 | tape | 128.0 | | 87.3 | 24.5 | | 3.3 |
| 190 | 3 | aluminum | 51.4 | | 43.4 | 26.8 | | 13.4 |
| 300 | 3 | aluminum | 91.8 | | 69.7 | 26.9 | | 10.7 |
| 400 | 3 | aluminum | 151.3 | | 107.8 | 31.1 | | 14.9 |
| 190 | 3 | tape | 48.8 | | 40.3 | 22.7 | | 7.2 |
| 300 | 3 | tape | 89.0 | | 65.2 | 25.2 | | 6.2 |
| 400 | 3 | tape | 142.2 | | 98.7 | 28.4 | | 9.8 |

*Aluminum outer layer not used on Kaowool blanket
**Estimated by computer. Test at 400 amps with two layers of Kaowool blanket was not run because the expected conductor temperature could damage the cable.

A comparison of the samples having the same number of fire barrier layers reveals that the ampacity derating required by the inventive material is significantly less than that required with either Kaowool blankets or the intumescent mat material. The air space between the fire barrier and conduit necessitated by the loose eye-shaped or corrugated wrap for the intumescent mat (see discussion after Table 5) is believed to be detrimental to ampacity rating. Even the inventive samples having 3 fire barrier layers compare favorably to the control materials having only two layers. Thus, the current carrying capacity of the cables in conduit does not suffer a great deal as a result of achieving adequate fire protection.

In addition, it can be noted that the addition of black tape to the outside helps to decrease the percent ampacity derating.

EXAMPLE V

Several other endothermic sheets of this invention were made having a higher ratio of inorganic, endothermic filler to refractory, inorganic fiber than the prior examples, and also using fiberglass as at least part of the inorganic fiber. These sheets were also made on the Fourdrinier machine mentioned in Example I. The particular sizes of the ATH filler used are shown in Table 8 below:

TABLE 8

| ATH* (in kg) Subdivided by Particle Size | | | | | | | |
|---|---|---|---|---|---|---|---|
| Sample | 11 | 12 | 13 | 14 | 15 | 16 | 17 |
| Mean Particle Size of Fraction: | | | | | | | |
| 12 micrometers | | 153.2 | 102.0 | 204 | 50.8 | 158.6 | 158.6 |
| 25 micrometers | 195.0 | 50.8 | 102.0 | | 153.2 | 54.4 | 54.4 |

*Obtained as Techfill alumina trihydrate from Great Lakes Minerals Company.

The resin latex and coagulants used were the same as in Example I, and the final compositions of the sheets of samples 11–17 are shown in Table 9.

TABLE 9

| Endothermic Sheet Composition (weight percent) | | | | | | | |
|---|---|---|---|---|---|---|---|
| Sample | 11 | 12 | 13 | 14 | 15 | 16 | 17 |
| Acrylic Resin | 2.0 | 1.9 | 2.0 | 2.0 | 2.0 | 2.0 | 2.0 |
| Alumino Silicate Fibers* | 8.0 | 7.7 | 5.0 | 5.0 | 5.0 | 2.0 | — |
| Glass Fibers** | 4.0 | 3.9 | 3.0 | 3.0 | 3.0 | 2.0 | 4.0 |
| Alumina-Trihydrate | 86.0 | 86.5 | 90.0 | 90.0 | 90.0 | 94.0 | 94.0 |
| Sheet Density (g/cc) | 0.73 | 0.80 | 0.94 | 0.93 | 0.93 | 1.04 | 0.93 |

*obtained as 2.5 micrometer mean fiber diameter Fiberfrax Bulk 6000 alumino-silicate from Carborundum Co.
**obtained as Tempstran Code 106/Type 475 0.6 micrometer diameter glass fibers from Manville Corp.

Fire tests, like those of Example II were conducted on specimens from samples 9 (retest), 12, 13, 16 and 17, and the results appear in Table 10 below:

TABLE 10

| ASTM E119-78 Flame Test of 2.54 cm Conduit | | | | | |
|---|---|---|---|---|---|
| Inventive Sample | 9 | 12 | 13 | 16 | 17 |
| Time to 315° C. (min.) | 54 | 64 | 60 | 64 | 69 |
| Material wt. (Kg/m.) | 3.1 | 3.1 | 3.1 | 3.2 | 3.4 |

The above data show that, for sheets of similar weights, increased endothermic filler concentrations provide a substantial extension of safe exposure time over the inventive samples shown previously and especially over the control samples reported in Table 5.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. An endothermic, flexible, fibrous sheet material at least 4 millimeters thick made of a composition comprising:
   (a) a refractory inorganic fiber;
   (b) an organic polymer binder; and
   (c) an inorganic, endothermic filler which undergoes an endothermic reaction between about 100° and 600° C.,
   said endothermic flexible fibrous sheet having: a weight ratio of organic to inorganic constituents of less than about 0.10, a density of at least 0.6 g/cc, and a weight ratio of inorganic endothermic filler of part (c) to inorganic fiber of part (a) in the range of about 0.5 to 40.

2. The flexible, fibrous sheet material of claim 1 wherein the weight ratio of organic to inorganic constituents is less than about 0.08.

3. The fibrous sheet material of claim 1 wherein the inorganic endothermic filler of part (c) is selected from the group consisting of alumina trihydrate and magnesium hydroxide.

4. The fibrous sheet material of claim 3 wherein the inorganic endothermic filler of part (c) is alumina trihydrate.

5. The fibrous sheet material of claim 3 having a calorific value of no more than about 2,400 joules per gram.

6. The fibrous sheet material of claim 5 having a calorific value of no more than 2000 joules per gram.

7. The fibrous sheet material of claim 1 wherein the organic polymer binder comprises about 1 to 6 weight percent of the total.

8. The fibrous sheet material of claim 1 having a weight ratio of inorganic endothermic filler of part (c) to inorganic fiber of part (a) in the range of about 5.0 to 40.

9. The fibrous sheet material of claim 1 having a density of about 0.70 to 1.5 grams per cubic centimeter.

10. The fibrous sheet material of claim 1 wherein the mean particle size of the inorganic endothermic filler is less than about 60 micrometers.

11. The fibrous sheet material of claim 1 wherein the inorganic fiber of part (a) is selected from the group consisting of silica, alumino-silicate, and glass fibers.

12. The fibrous sheet material of claim 11 wherein the inorganic fiber comprises alumino-silicate fiber.

13. The fibrous sheet material of claim 11 wherein the inorganic fiber is comprised of glass fibers.

14. The fibrous sheet material of claim 1 which further comprises a metal foil backing on one side.

15. The fibrous sheet material of claim 1 which further comprises a fabric scrim adhered to the sheet.

16. An enclosure for protecting articles from fire made from the endothermic, fibrous sheet of claim 1 secured around the article to be protected.

17. A cable tray wrapped with the endothermic, flexible, fibrous sheet of claim 1.

18. A conduit wrapped with the endothermic, flexible, fibrous sheet of claim 1.

19. A method of protecting an article from fire comprising enclosing said article within the endothermic, fibrous sheet material of claim 1.

20. The fibrous sheet material of claim 1 wherein the organic polymer binder is derived from a non-ionic latex.

21. An endothermic, flexible, fibrous sheet material at least 4 millimeters thick made of a composition comprising:
   (a) a refractory inorganic fiber having a fiber diameter of less than one micrometer;
   (b) an organic polymer binder; and
   (c) an inorganic, endothermic filler which undergoes an endothermic reaction between about 100° and 600° C., said endothermic flexible fibrous sheet having a weight ratio of organic to inorganic constituents of less than about 0.10, a density of at least 0.6 g/cc, and a weight ratio of inorganic endothermic filler of part (c) to inorganic fiber of part (a) in the range of about 0.5 to 40.

22. The flexible fibrous sheet material of claim 21 wherein the refractory inorganic fiber is fiberglass.

* * * * *